United States Patent [19]

Storrs

[11] 3,875,305

[45] Apr. 1, 1975

[54] PRODUCTION OF CHEDDAR CHEESE
[75] Inventor: Arnold B. Storrs, Solon Mills, Ill.
[73] Assignee: Lacto Products Co., Inc., Milwaukee, Wis.
[22] Filed: July 16, 1973
[21] Appl. No.: 379,481

[52] U.S. Cl.......................... 426/38, 426/36, 426/61
[51] Int. Cl............................................. A23c 19/02
[58] Field of Search ............ 426/34, 36, 37, 38, 43, 426/61

[56] References Cited
UNITED STATES PATENTS

| | | | |
|---|---|---|---|
| 3,048,490 | 8/1962 | Lundstedt | 426/38 |
| 3,295,991 | 1/1967 | Cort et al. | 426/38 X |
| 3,323,921 | 6/1967 | Moseley et al. | 426/43 |
| 3,483,087 | 12/1969 | Christensen | 426/36 |

*Primary Examiner*—David M. Naff

[57] ABSTRACT

Cheddar cheese having improved body and flavor characteristics is produced by adding a small amount of either an active or inactivated culture of *Streptococcus diacetilactis* to the cheese curd prior to hooping.

7 Claims, No Drawings

PRODUCTION OF CHEDDAR CHEESE

BACKGROUND OF THE INVENTION

This invention relates to a method for preparing cheddar cheese and, more particularly, a method for improving the development of body and flavor characteristics of cheddar cheese during aging.

A typical conventional process for preparing cheddar cheese includes the steps of coagulating milk by the combined action of a lactic acid-producing bacteria, such as *Streptococcus lactis* and/or *Streptococcus cremoris*, and one or more enzymatic coagulants, such as rennet, to form a curd, cutting and cooking the curd, separating the curd from the whey portion of the milk, packing the curd into hoops or other containers of desired size and shape, and then curing or aging the hooped curd mass under controlled temperature conditions to allow the body and flavor of the cheddar cheese to slowly develop. Generally, the flavor of the cheese becomes more pronounced and the body more mellow with increased aging time. When a high quality cheddar cheese is desired, a curing or aging period of a year or more may be required to obtain optimum body and flavor characteristics. In any case, a curing or aging period of at least 60 days is generally required before the product can be truly considered a natural cheese.

Although the flavor and body characteristics which make up a good cheese are well known and can be identified, the specific processes by which these characteristics develop during aging are not fully understood. Cheese making is basically a microbiological process. Some of the basic criteria for obtaining a good product having desired body and flavor characteristics include the use of milk having specific chemical and physical properties, the use of proper bacterial cultures and enzymatic materials which promote the microbiological activity required to develop the desired body and flavor characteristics during aging, maintaining the system free of bacterial contaminants which can adversely effect curd formation and/or the development of body and flavor during aging, and maintaining close control of various operating conditions during all the process steps. Consequently, production of cheese having good body and flavor characteristics still depends to a large degree upon the expertise of the cheese maker. For instance, a particular cheese making process may be capable of producing a cheese having excellent flavor characteristics so long as certain specified parameters are closely adhered to. However, slight variations from one or more of the specified parameters can cause off-flavors, such as "acid", "cooked", or "caramel" to develop in the final aged product.

SUMMARY OF THE INVENTION

The present invention is based on the discovery that the organism *Streptococcus diacetilactis* can be utilized to improve the body and flavor characteristics of a cheddar cheese provided it is added to the process at the proper stage. *S. diacetilactis* has been employed in the manufacture of a variety of dairy products such as buttermilk and cottage cheese. Examples of such use are described in U.S. Pat. Nos. 3,323,921 and 3,048,490. If used in the usual manner of culturing, *S. diacetilactis* normally produces sizable amounts of carbon dioxide which, in the production of cheddar cheese, would result in an unmanageable, floating curd structure. For that reason, *S. diacetilactis* has heretofore been rigorously avoided in any phase of the manufacture of cheddar cheese. If the organism is used as provided in the present invention, however, no problems from gas production are encountered.

In accordance with the invention, a *Streptococcus diacetilactis* culture, either as a viable culture, an inactivated culture, or a mixture thereof, is mixed with the cheese curd, after the whey has been separated therefrom but before it is placed in containers or hoops for curing or aging. The process for making the cheddar cheese is otherwise conventional. Instead of causing a detrimental effect on the body texture of the cheese, as might be expected because of the gas producing characteristics of *S. diacetilactis*, treatment of the cheddar cheese with this particular species of bacteria in the above manner has been found to produce a product having tighter, longer, smoother body characteristics within relatively short curing or aging. Furthermore, this treatment does not impart any appreciable characteristic flavor of its own, but instead effectively counterbalances or prevents the development of off-flavors which typically are encountered when poor quality control conditions exist during the manufacturing process.

A primary object of this invention is to provide a method for preparing cheddar cheese having superior body characteristics within reduced curing or aging periods.

Another object of this invention is to provide a method for preparing cheddar cheese whereby the development of off-flavors during aging is minimized.

Other objects, aspects and advantages of this invention will become apparent upon reviewing the following detailed description and the appended claims.

DESCRIPTION OF THE PREFERRED EMBODIMENTS

A process used for preparing cheddar cheese in accordance with this invention is conventional except that a small amount of a *Streptococcus diacetilactis* culture is mixed into the drained cheese curd prior to placement of the curd mass into containers or hoops for aging. The ingredients, operating conditions, etc. used in the basic steps for such cheese making processes are well known and do not constitute part of the invention. Therefore, a detailed description of same is not deemed necessary for those skilled in the art to understand the invention and is omitted for the sake of brevity. As is well known, such processes generally include the basic steps of producing a curd by adding a lactic acid-producing starting culture, such as *Streptococcus lactis* and/or *S. cremoris*, and one or more enzymatic coagulants, such as rennet, to a starting milk mixture, cutting the curd, cooking the curd, draining the cooked curd to separate the whey portion of the milk therefrom, salting the curd mass, packing the curd mass into hoops or other containers of desired size and shape, and then curing the cheese under controlled temperature conditions.

In accordance with the invention, a small amount of a *S. diacetilactis* culture, is mixed into the cheese curd, after the curd has been drained but before being packed into hoops or similar containers. The culture can be comprised primarily of active (live, viable) cells, primarily of inactive cells, or a mixture of active and inactive cells. *S. diacetilactis* cultures are well known and are readily obtainable from many recognized culture collections. Although the various strains of the *S. diacetilactis* species are believed to be suitable for use in this invention, the strain *S. diacetilactis* DRC-1 is presently preferred.

*S. diacetilactis* cultures suitable for use in this invention can be obtained by adding an inoculum thereof to a suitable nutrient medium, incubating the inoculating medium under suitable temperature and pH conditions to obtain a full growth of cells, and then separating the cells from the medium. Various known culture media can be employed including milk-based substrates, such as homogenized whole milk, skim milk, cream, etc. The length of time required to provide an adequate growth of *S. diacetilactis* will vary depending upon the growth characteristics of the strain of the bacteria employed, the size of the inoculum, the culture medium employed, the temperature of the incubation, etc. As a guide, a suitable culture can be prepared in the following manner. A *S. diacetlactis* culture is inoculated into a nutrient medium including 1 wt. % dry skim milk, 0.5 wt. % sodium citrate, 1.5 wt. % dextrose, 1 wt. % yeast extract, 0.05 wt. % magnesium sulfate, 0.004 wt. % sodium sulfite, and 0.0067 wt. % manganese chloride as the active ingredients. The inoculated medium is incubated at 80°–85°F., with the pH thereof being adjusted and maintained at 5.5–6, until cell growth is completed. The completion of cell growth can be determined by observing the optical density of the medium. Viable cells are then harvested as a paste, such as by collecting with a supercentrifuge.

When an active culture is to be used, this freshly grown paste can be added directly to the cheese curd or preserved for future use by freezing in a conventional manner, in which case the paste is usually diluted with a phosphate buffer to a pH of about 6 before freezing. If desired, the diluted paste can be freeze-dried in a conventional manner for storage. When an inactivated culture is to be used, a suitable inactivating material, such as acetone, is added to a solution containing viable cells, such as a water-diluted paste or a water suspension containing freeze-dried culture powder, and the precipitated fraction containing the inactivated cells is separated by evaporation, filtering, or the like.

The mechanism responsible for the advantageous results achieved by treating a cheese curd with a *Streptococcus diacetilactis* culture in accordance with this invention is not fully understood at this time. Both active and inactivated cultures are effective in improving the body and flavor characteristics so it would appear that the results are due more to some type of enzymatic process or some other unknown factors than to the metabolic activity of live bacteria.

In order to obtain the best results, the *S. diacetilactis* culture should be thoroughly mixed into and substantially uniformly dispersed throughout the cheese curd. Therefore, before being added to the curd, the culture is preferably mixed with a sufficient amount of water to facilitate this mixing and dispersing. Of course, use of excessive amounts of water which would adversely affect the body texture of the resultant cheese should be avoided. In cheese making processes including a salting step after draining but before hooping, the culture can be added before or after salting and, if desired, can be added along with the salt so long as it is thoroughly mixed into and uniformly dispersed throughout the cheese curd.

The addition of very small quantities of a *S. diacetilactis* culture to the cheese curd is effective for improving the body and flavor characteristics of the cheese products. The specific quantity used depends primarily upon whether or not an active or inactive culture is used and the amount of improvement desired.

It has been found that an active culture is somewhat more effective than an inactive culture in improving the body and flavor characteristics of the resultant cheese product by a factor of perhaps 2 to 5 times, especially at higher curing temperatures. Thus, less active culture is required to produce the same results. However, under some circumstances, such as where facilities for handling or storing viable cultures are not available, the cheese maker may find it more advantageous to use inactivated cultures.

Generally, the addition of *S. diacetilactis* cultures to the cheese curd in concentrations as low as 1 part per million is effective to provide some improvement in the body and flavor characteristics of the resultant cheese product. While higher concentrations can be used, the added improvement produced by using culture concentrations higher than about 100 parts per million generally is overriden by the additional expense associated therewith. When an inactivated culture is used, the preferred concentration is within the range of about 10 to about 100 parts per million. When an active culture is used, the preferred concentration is within the range of about 1 to about 50 parts per million.

The following examples are presented for purposes of illustrating the process of this invention and are not to be construed as limitations thereto.

EXAMPLE 1

Tests were performed to evaluate the effect of treating a cheddar cheese with a *S. diacetilactis* in accordance with the invention. The cheedar cheese used was prepared by a conventional, so-called granular process. Two 20 lb. samples of cheese curd prepared by this process were used for the test, one being used as a control sample and the other as a test sample. After draining both curd samples were processed in the identical manner except that, after draining and salting but before hooping, an inactivated *S. diacetilactis* culture was added to the test sample. Otherwise the two samples were processed in the identical manner.

A concentrated paste of freshly grown cells was prepared from a culture of *S. diacetilactis* DRC-1 in the nutrient medium and in the manner described in detail above. The cells were inactivated by adding an equal volume of acetone to the paste. After about 1 hour, the mixture was subjected to a moderate vaccum to remove substantially all of the acetone and then completely dried under a high vaccum. 100 parts per million of the thus-prepared inactivated culture (diluted with a small quantity of water to aid in dispersion) was thoroughly mixed into the test sample curd. The control and test samples were placed in separate hoops, pressed, covered and wrapped in the usual manner, and then stored at 50°F. for aging.

Sample trier plugs were removed from both samples at intervals during a 12 month storage period and examined by a panel of experienced judges for physical and flavor characteristics. Within the first month of aging, a marked difference between the body characteristics of the two samples was observed. The test sample had begun to develop a body which was "longer" (i.e. more flexible and pliable) and had a smoother, closer texture than that of the control sample. The control sample initially developed an acid flavor and gradually became more mild and mellow during the 12 month period. On the other hand, the test sample did not develop a comparable acid flavor and throughout the 12 month aging period consistently was scored as having a flavor which was smoother and more mellow than that of the control sample.

EXAMPLE 2

In another test, 20 lb. control and test curd samples were taken from a different batch of cheddar cheese prepared by the same granular process as in Example 1. The same procedure of Example 1 was followed except that an active or viable *S. diacetilactis* culture was used instead of an inactivated culture.

A concentrated paste of freshly grown cells was prepared from a culture of *S. diacetilactis* DRC-1 in the nutrient medium and in the manner described in detail above. The resultant paste was freeze-dried in a conventional manner to retain the viability of the cells. 10 parts per million of the thus prepared dry viable cells (diluted in a small amount of water sufficient to aid in the dispersion) were added to the test sample curd in the same manner and at the same point of production as in Example 1. The two samples were processed and periodically examined during a 12 month aging period in the same general manner as in Example 1.

The differences between the body characteristics of the control and test samples were generally the same as in Example 1. The test sample developed a more desirable "long" body having a texture which was smoother and closer than that of the control sample. The differences in flavor development was much more pronounced than in Example 1. The control sample developed a caramel, cooked flavor which was quite unpleasant and became progressively worse with aging. After 10 months of aging, the control sample was judged to be completely unacceptable. On the other hand, the test sample never did develop a similar off-flavor and, in fact, developed a highly acceptable characteristic chedder cheese flavor.

From the results of Examples 1 and 2, it can be seen that treatment of a cheddar cheese curd in accordance with the invention produces a cheese which develops superior body characteristics within shorter aging periods. This capability of producing acceptable cheeses within shortened aging periods can represent a substantial cost saving to the cheese maker. Also, such treatment counterbalances or prevents the development of certain off-flavors. Thus, the treatment in effect is capable of compensating for variations in the cheese making process which would otherwise result in the cheese having undesirable flavor characteristics.

EXAMPLE 3

Another series of samples were prepared from another batch of cheese curd prepared by the same granular process as in Example 1. The curd samples were treated with an inactive *S. diacetilactis* DRC-1 culture as in Example 1 and an active *S. diacetilactis* DRC-1 as in Example 2. Standard plate counts were run on each of the cultures to determine the relative viability. The inactive culture was found to have a count of 20,000 viable organisms while the active culture had a count of $1 \times 10^{12}$, or 50 million times the viability of the inactive culture.

Varying amounts of the two cultures were added to separate 20 lb. samples of the curd in the same manner and at the same point of production as in Example 1 and a 20 lb. sample was maintained as a control. The inactive culture was added in concentrations of 10, 50 and 100 parts per million while the active culture was added at concentrations 1, 10 and 50 parts per million. After hooping and pressing, each sample was cut in half and wrapped. One 10 lb. portion of each sample was stored at 40° for aging and the other 10 lb. portion of each sample was stored at 50°F. for aging. The cheeses were then examined at intervals throughout a 12 month storage period. The results agreed with those obtained in Examples 1 and 2. However, the differences between the flavor characteristics of the test samples and the control samples were not quite so pronounced, possibly because better quality control was maintained for this batch than for the batches used in Examples 1 and 2.

For the samples stored at 40°F., the test samples, at all treatment levels, were judged somewhat better than the control sample stored at the same temperature, i.e., were less mealy, had longer bodies, and had better flavor development. However, there was not any significant differences between the body and flavor characteristics of the various test samples even though different levels of culture treatment had been used.

For the samples aged at 50°F., the differences between the body and flavor characteristics of the test samples and the control samples were more pronounced. The body and flavor characteristics produced by varying levels of culture treatment were also more noticeable with the body improvement being more definite and the flavor development more pronounced with increasing levels of treatment.

With respect to relative effectiveness of the active and inactive *S. diacetilactis* cultures, the active culture was about 2 to 5 times more effective at the high storage temperature. The fact that the differences were no greater than this suggests that the improvement in body and flavor characteristics probably is due more to the result of enzymatic processes or some other unknown factors than to the metabolic actions of viable cells.

Although the preferred embodiments of this invention have been described in detail, it will be apparent to those skilled in the art that various changes and modifications can be made thereto without departing from the spirit and the scope of the invention.

I claim:

1. A process for preparing a cheddar cheese which includes the steps of coagulating milk with a lactic-acid producing starting culture to form a curd, cutting the curd, cooking the curd, separating the curd from the whey portion of the milk, hooping the curd, and aging to produce a cheese, wherein the improvement comprises admixing a *Streptococcus diacetilactis* culture with the separated curd prior to hooping, the amount of said culture being at least 1 part per million parts of said curd.

2. A process according to claim 1 wherein the concentration of said culture added to the curd is within the range of about 1 to about 100 parts per million.

3. A process according to claim 1 wherein said culture is *Streptococcus diacetilactis* DRC-1.

4. A process according to claim 1 wherein said culture is comprised of live, viable cells.

5. A process according to claim 1 wherein said culture is comprised of inactivated cells.

6. A process according to claim 4 wherein the concentration of said culture added to the curd is within the range of about 1 to about 50 parts per million.

7. A process according to claim 5 wherein the concentration of said culture added to the curd is within the range of about 10 to about 100 parts per million.

* * * * *